(12) United States Patent
Testud et al.

(10) Patent No.: US 7,417,577 B2
(45) Date of Patent: Aug. 26, 2008

(54) METHODS OF ESTIMATING PRECIPITATION CHARACTERISTICS

(75) Inventors: Jacques Testud, Paris (FR); Richard Ney, La Varenne Saint-Hilaire (FR); Erwan LeBouar, Paris (FR)

(73) Assignee: Centre National de la Recherche Scientifique - CNRS (FR)

( * ) Notice: Subject to any disclaimer, the term of this patent is extended or adjusted under 35 U.S.C. 154(b) by 26 days.

(21) Appl. No.: 10/576,374

(22) PCT Filed: Oct. 21, 2004

(86) PCT No.: PCT/FR2004/002692

§ 371 (c)(1),
(2), (4) Date: Apr. 18, 2006

(87) PCT Pub. No.: WO2005/040853

PCT Pub. Date: May 6, 2005

(65) Prior Publication Data

US 2007/0103359 A1     May 10, 2007

(30) Foreign Application Priority Data

Oct. 21, 2003   (FR)   ................................... 03 12299

(51) Int. Cl.
*G01S 13/95* (2006.01)
*G01S 17/95* (2006.01)
*G01S 13/00* (2006.01)

(52) U.S. Cl. .................... 342/26 R; 342/26 D; 342/175; 342/176; 342/179; 342/195; 73/170.16; 73/170.17; 702/1; 702/2; 702/3

(58) Field of Classification Search ...... 342/26 R–26 D, 342/27, 28, 175, 176, 179, 188–197; 702/1–3; 73/170.16, 170.17

See application file for complete search history.

(56) References Cited

U.S. PATENT DOCUMENTS

| 2,656,531 | A | * | 10/1953 | Atlas ......................... 342/26 R |
| 4,613,938 | A | * | 9/1986 | Hansen et al. .................. 702/3 |
| 4,660,038 | A | * | 4/1987 | Greneker, III ............. 342/26 D |
| 5,850,619 | A | * | 12/1998 | Rasmussen et al. ............ 702/3 |
| 5,974,360 | A | * | 10/1999 | Otsuka et al. .................. 702/3 |
| 6,473,026 | B1 | | 10/2002 | Ali-Mehenni et al. |
| 2003/0025627 | A1 | | 2/2003 | Wilson et al. |

FOREIGN PATENT DOCUMENTS

| EP | 1 049 944 A | 11/2000 |
| FR | 2658617 A1 * | 8/1991 |
| FR | 2 774 174 A1 | 7/1999 |
| FR | 2 827 391 A1 | 1/2003 |
| JP | 02-300692 A | 12/1990 |
| WO | WO 03/007016 A1 | 1/2003 |

* cited by examiner

*Primary Examiner*—Bernarr E Gregory
(74) *Attorney, Agent, or Firm*—DLA Piper US LLP

(57) ABSTRACT

A method of estimating precipitation characteristics including acquiring a radar image including at least a vertical plane of a precipitation zone; processing a vertical profile to generate digital signals representative of reflectivity in vertical direction z; integrating the signals representative of reflectivity by assimilation of a reflectivity vertical profile in an aggregation model to generate a signal representative of the profile in the vertical plane of a mean particle diameter weighted by mass of each particle; and determining concentration of the solid particles on the basis of signals previously determined.

20 Claims, 5 Drawing Sheets

Altitude (m) above ground level

Altitude (m) above the isotherm 0°C

Altitude (m) above the isotherm 0°C

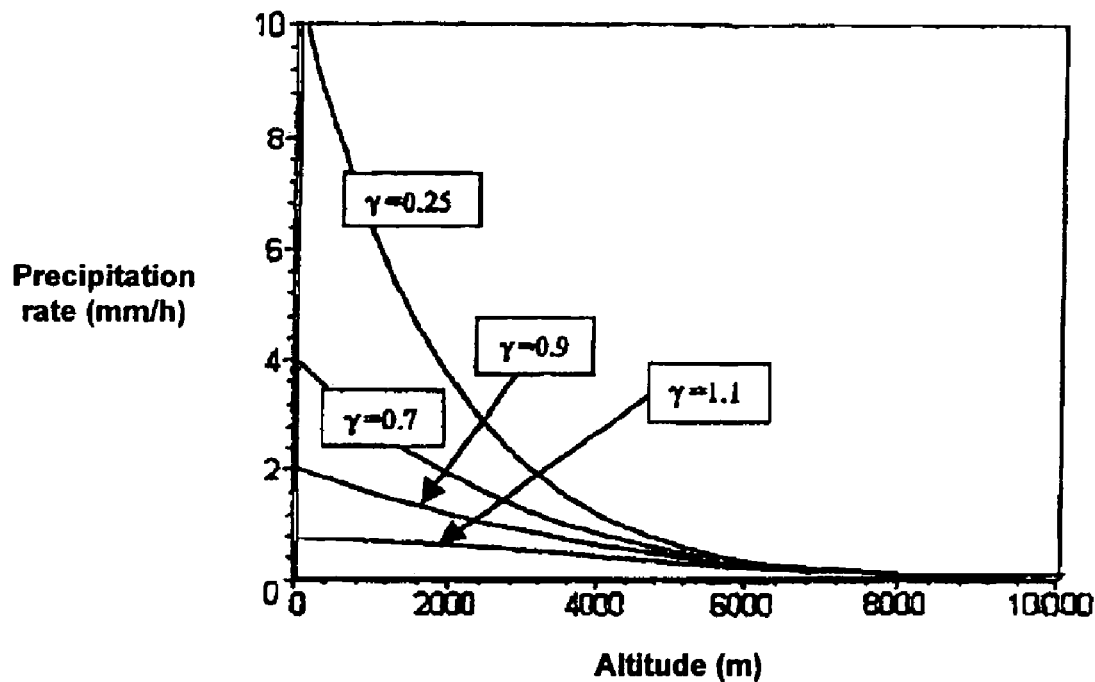
*Fig. 9*
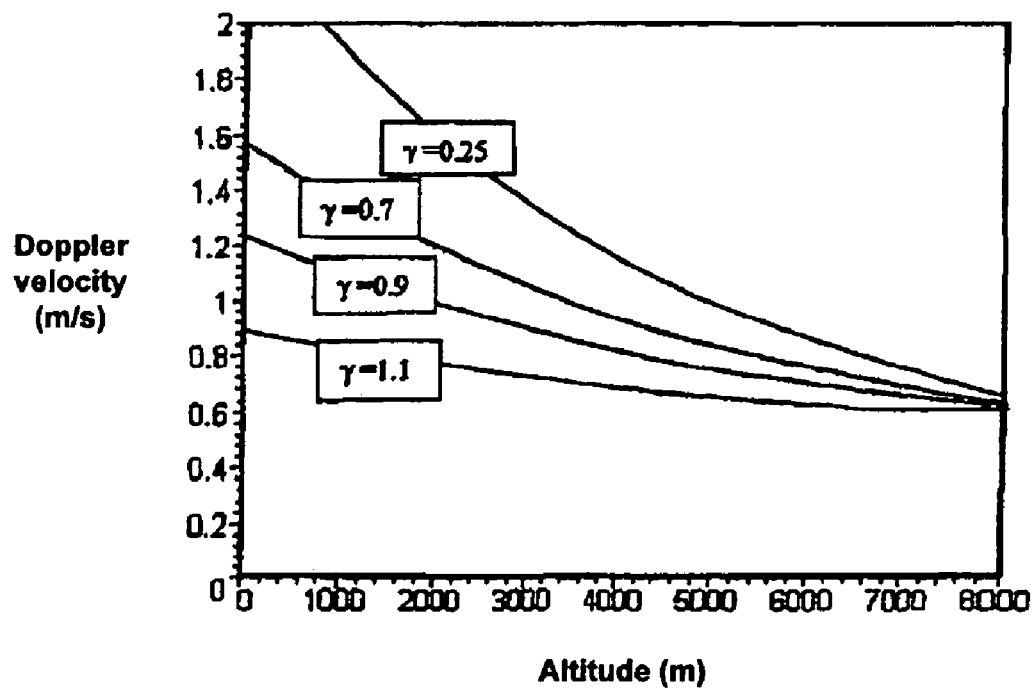

METHODS OF ESTIMATING PRECIPITATION CHARACTERISTICS

RELATED APPLICATION

This is a §371 of International Application No. PCT/FR2004/002692, with an international filing date of Oct. 21, 2004 (WO 2005/040853 A1, published May 6, 2005), which is based on French Patent Application No. 03/12299, filed Oct. 21, 2003.

1. Technical Field

This invention relates to methods of estimating precipitation characteristics and, in one particular aspect, precipitation rate for solid precipitation.

2. Background

It is known that the characteristics of a radar image can be used to estimate rainfall characteristics. In particular, EP 1 049 944 describes a technique for estimating rainfall using a radar. In that patent, provision is made for the following steps:

- using a dual-polarized radar to measure the differential phase shift ($\Phi dp$) and the apparent reflectivity Z in at least one of the H (horizontal) or V (vertical) polarizations and over a given range (ro, ri) of path radii relative to the radar;
- determining an estimate of the value No* representative of the size distribution of the rain drops, on the basis of the differential phase shift difference over the range ro to ri, and on the basis of an integral of a function of the apparent reflectivity Z, over the range (ro, ri); and
- deducing the value of the precipitation rate at a point on the basis of No* and of the apparent reflectivity at the point.

A method of estimating rainfall is also known from WO 03/007016, which describes a method of estimating a precipitation rate by means of a dual-polarized radar, that method being characterized by the following steps:

- using a dual-polarized radar to measure the differential phase shift $\Phi dp$ and attenuated reflectivity Z in at least one of the H or V polarizations and over a given range (r1, r0) of path radii r relative to the radar;
- determining an estimate of the value K(r0) of the specific attenuation at r0 on the basis of the profile of the attenuated reflectivity measured in this way, and on the basis of the differential phase shift difference over the range r0 to r1; determining an estimate K(r) of the specific attenuation at r as a function of the attenuation K(r0) determined in this way and of the attenuated reflectivity profile Z(r); and determining the precipitation rate R(r) once K(r) is known.

Those various solutions make it possible to characterize liquid precipitation and estimate precisely rainfall rate (in millimeters per hour (mm/h), but they do not make it possible to estimate the characteristics of solid precipitation such as snow.

SUMMARY

This invention relates to a method of estimating precipitation characteristics including acquiring a radar image including at least a vertical plane of a precipitation zone, processing a vertical profile to generate digital signals representative of reflectivity in vertical direction z, integrating the signals representative of reflectivity by assimilation of a reflectivity vertical profile in an aggregation model to generate a signal representative of the profile in the vertical plane of a mean particle diameter weighted by mass of each particle, and determining concentration of the solid particles on the basis of signals previously determined.

BRIEF DESCRIPTION OF THE DRAWINGS

Selected aspects of the invention will be better understood on reading the following description, given with reference to a non-limiting example and selected graphic representations below:

FIG. 8 is a graph of the sensitivity of the retrieval of the equivalent precipitation rate (mm/h) to the particle density law $\rho(D) \propto D-\gamma$; and FIG. 9 is a graph of the sensitivity of the retrieval of the vertical Doppler velocity to the particle density law $\rho(D) \propto D-\gamma$.

DETAILED DESCRIPTION

This disclosure provides methods of estimating precipitation characteristics and, in a particular selected aspect, a precipitation rate for solid precipitation, the method comprising an acquisition and processing step comprising acquiring a radar image including at least a vertical plane of a precipitation zone, and in processing a vertical profile to deliver digital signals representative of reflectivity in the vertical direction h, an integration step comprising integrating signals representative of reflectivity to deliver a signal representative of the profile in the vertical plane of a mean particle diameter weighted by the mass of each particle, and a determination step comprising determining the concentration of the solid particles on the basis of the signals computed in the preceding steps.

Figure 1:
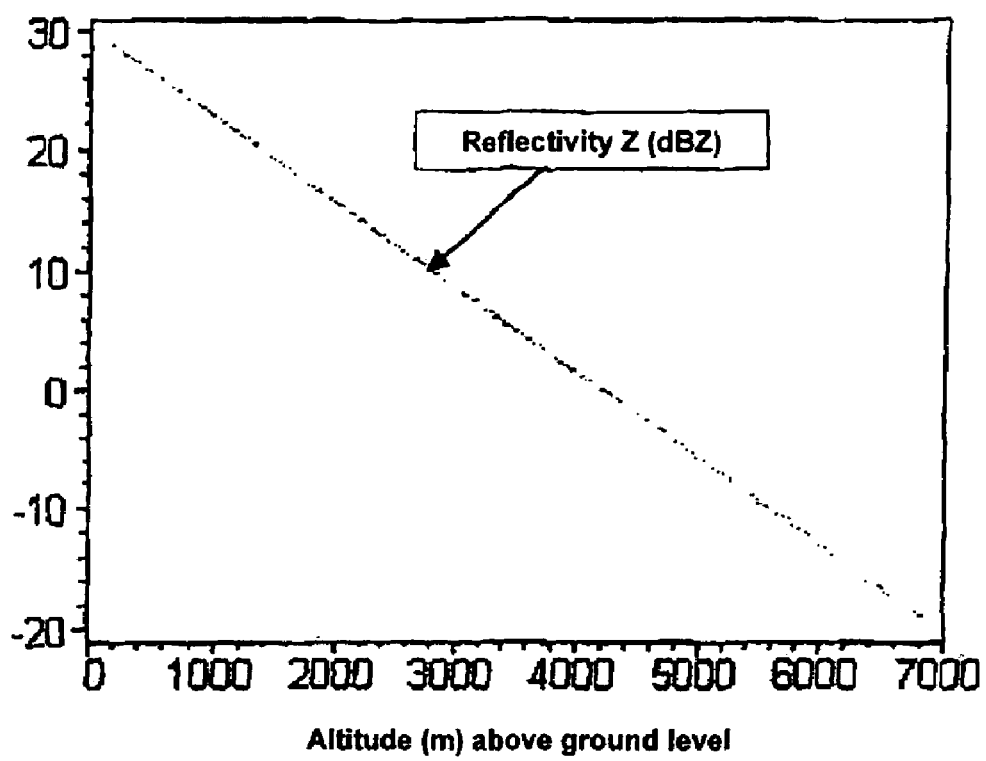
FIG. 1 is a graph of a vertical profile of Z to be inverted (in this example, the isotherm 0° C. is at ground level)
Figure 2:
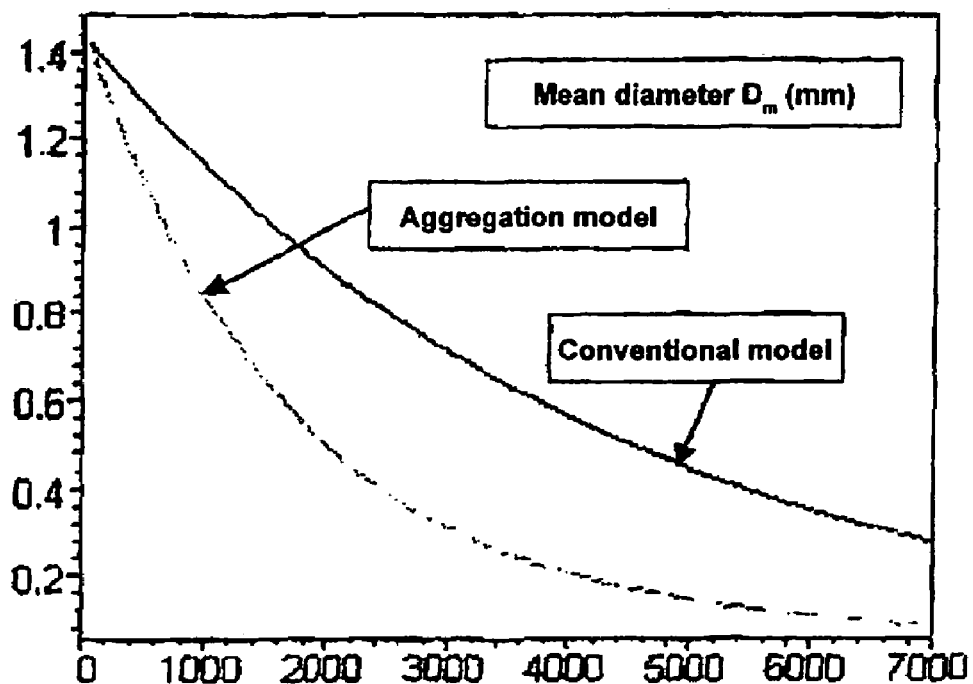
FIG. 2 is a graph of a profile of Dm resulting from Z being inverted by the aggregation model compared with a conventional estimator.
Figure 3:
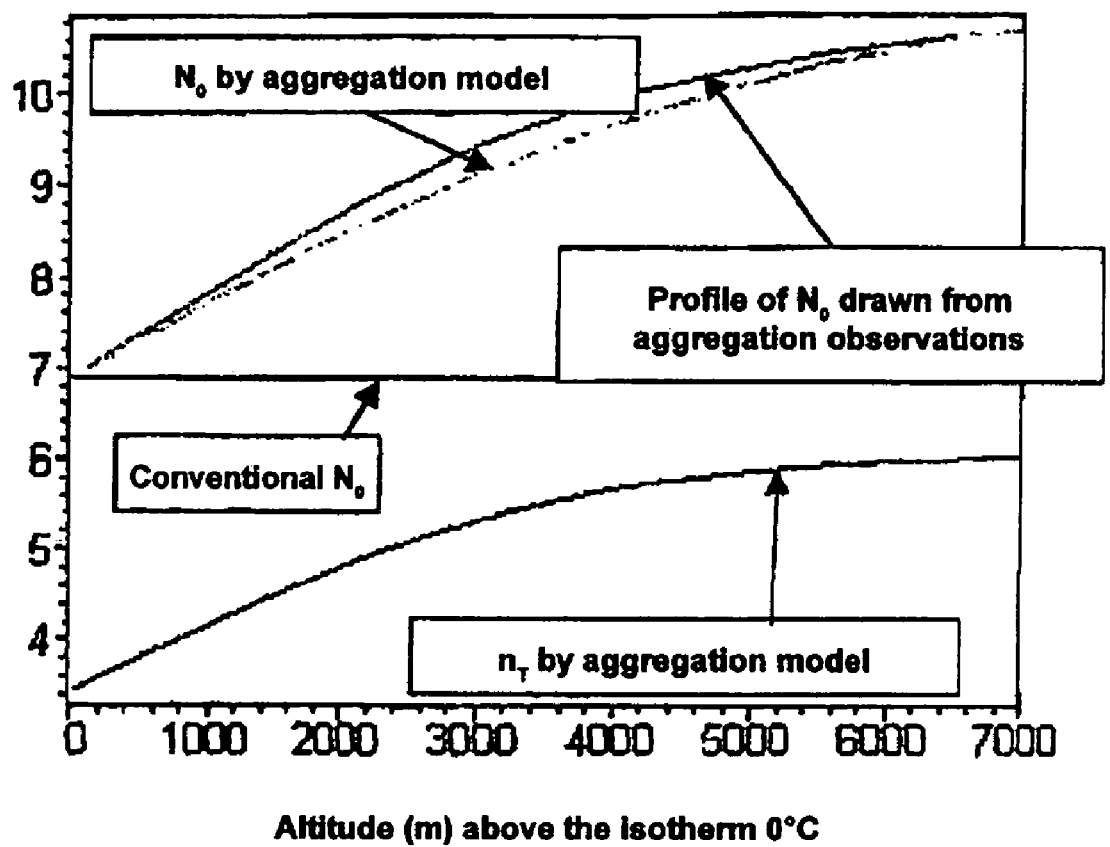
FIG. 3 is a graph of profiles of N0 and of nT resulting from Z being inverted by the aggregation model compared with a conventional hypothesis and observations.

Reference will be made to the drawings below as appropriate. Steps in accordance with selected aspects of the method may be seen in one sense by reference to FIGS. 1-3.

In a preferred aspect, the integration step comprises determining the variable Z(h) of the radar observable in mm$^6$/m$^3$ as a function of the altitude h on the basis of the radar image, and determining the mean diameter Dm(h) of the particles by solving the following equation:

In a preferred aspect, the integration step comprises determining the variable Z(h) of the radar observable in mm$^6$/m$^3$ as a function of the altitude h on the basis of the radar image, and determining the mean diameter Dm(h) of the particles y solving the following equation:

$$\frac{\delta D_m}{\delta h} \equiv -0.25 k_{\mathit{eff}} a D_m^{b-5} 10^{-18} Z + \left(\frac{11 \delta Z}{6 Z \delta h}\right) D_m \qquad (2)$$

where:

Z is the radar observable to be inverted in $mm^6 m^{-3}$;

$D_m$ is in meters (m);

a and b are coefficients specific to particles of the "aggregate" type; for example, the coefficient a is equal to 35184 and the coefficient b is equal to 3.16;

$k_{eff}$ is the coefficient of effectiveness of the aggregation process to be adjusted, said coefficient $k_{eff}$ being equal to 0.3.

Integration of (2) uses an integration boundary condition. Advantageously, the integration boundary condition is determined so that the value $D_m(h)$ at the top of the cloud corresponds to the predetermined value for the total number of particles at the top of the cloud.

In an advantageous implementation, the profile of the total number of particles $n_t(h)$ is determined by the following equation:

$$n_T(h) = x \cdot Z(h)/D_m(h)^6$$

where x is equal to $25.4 \cdot 10^{-18}$.

In another implementation, the meteorological parameter $N_O(h)$ is determined by the following equation:

$$N_O(h) = y \cdot Z(h)/D_m(h)^7$$

where y is equal to $102 \cdot 10^{-18}$.

In another aspect, the meteorological parameter corresponding to the profile of the ice water content IWC(h)(in $g/m^3$) is determined by the following equation:

$$IWC(h) = w Z(h)/D_m(h)^3$$

where w is equal to $1.25 \cdot 10^{-12}$.

In yet another aspect, the meteorological parameter corresponding to the profile of the solid precipitation rate R(h) (mm/h equivalent melted) is determined by the following equation:

$$R(h) = r \cdot Z(h)/D_m(h)^{2.35}$$

wherein r is equal to $4.698 \cdot 10^{-10}$.

The method applies to stratiform precipitation. It considers that ice-forming nuclei are activated at highly negative temperatures, i.e., at the top of the cloud. Ice crystals formed at high altitude settle and grow as they fall, either by sublimation of the ambient saturating water vapor, or by collection and freezing of supermelted cloud water droplets, or by random aggregation of their collisions with other ice crystals. Of the three growth processes, only aggregation changes the ice particle concentration. The characterization method is based on a simplified description of the aggregation mechanism. We use a class of "profiler" methods that inverts the vertical profile of reflectivity measured in the ice to extract therefrom the vertical profile of the solid precipitation rate.

Selected steps include:

1—Particle size distribution expressed in "equivalent melted diameter" is assumed to be exponential, i.e.:

$$N(D) = N_0 \exp(-4D/D_m) \tag{1}$$

where N(D) is the concentration of particles per cubic meter ($m^3$) and per diameter range, and $N_0$ and $D_m$ are the two parameters that characterize distribution.

2—The top $h_{max}$ and the base $h_{min}$ of the layer of solid precipitation are determined;

a. $h_{max}$ is the maximum altitude of the measured reflectivity profile Z(h).

b. $h_{min}$ is either the altitude of the isotherm 0° C. if the ground-level temperature is positive, or it is ground level if the ground-level temperature is negative.

3—The profile of the parameter Dm(h) in the range $h_{max}$ to $h_{min}$ is then determined by resolving the following differential equation:

$$\frac{\delta D_m}{\delta h} \equiv -0.25 k_{eff} a D_m^{b-5} 10^{-18} Z + \left(\frac{11 \delta Z}{6 Z \delta h}\right) D_m \tag{2}$$

where:

Z is the radar observable to be inverted in $mm^6 m^{-3}$;

$D_m$ is in meters (m);

a and b are coefficients specific to particles of the "aggregate" type, equal respectively to 35184 and to 3.16 on the basis of the observations of J. D. Locatelli and P. V. Hobbs, *Fall speeds and masses of solid precipitation particles*, J. Geo-phys. Res., 79, 2185-2197 (1974), the subject matter of which is incorporated herein by reference;

$k_{eff}$ is the coefficient of effectiveness of the aggregation process to be adjusted (the value $k_{eff}=0.3$ seems correct).

4—The integration of (2) takes place from the top, where the boundary condition is expressed by fixing the total number of particles $n_T$ (or the number of ice-forming nuclei activated at the top of the cloud). It is possible to take $n_T(h_{max}) = 10^6 m^{-3}$, which makes it possible to express the boundary condition $D_m(h_{max})$ as:

$$Dm(H_{max}) = 25.4 \cdot 10^{-18} (Z(h_{max})/n_T(h_{max}))^{1/6} \tag{3}$$

5—Once the profile $D_m(h)$ from $h_{max}$ to $h_{min}$ has been determined, the profiles of the other parameters of interest are computed by the following expressions:

a. Profile of $N_0$: $N_0(h) = 102 \cdot 10^{-12} Z(h)/D_m(h)^7$ b. Profile of the total number of particles $n_T(h)$ (in $m^{-3}$): $N_T(h) = 102 \cdot 10^{-12} Z(h)/D_m(h)^6$ c. Profile of the ice water content IWC(h) (in $g/m^3$):

$$IWC(h) = 1.25 \cdot 10^{-12} Z(h)/D_m(h)^3$$

d. Profile of the solid precipitation rate R(h)(mm/h equivalent melted). By using the terminal fall velocity determined by Locatelli and Hobbs for aggregates: ($v^T = 107.6 D^{0.65}$ (D in m)), R(h) is expressed by:

$$R(h) = 4.698 \cdot 10^{-10} Z(h)/D_m(h)^{2.35}$$

The following description relates to another selected aspect of a method of processing for determining the precipitation rate.

For rainfall, the algorithm used is the ZPHI algorithm which is the subject of FR 98/00714 and FR 01/09206, the subject matter of which is incorporated by reference.

For solid precipitation, the following description applies.

The method for estimating the precipitation rate for solid precipitation includes a class of "profiler" algorithms that inverts the vertical profile of reflectivity measured in the ice to extract therefrom the vertical profile of the solid precipitation rate.

The method applies to stratiform precipitation. It considers that the ice-forming nuclei are activated only at highly negative temperatures, i.e., at the top of the cloud. The ice crystals formed at high altitude settle and grow as they fall, either by sublimation of the ambient saturating water vapor, or by collection and freezing of supermelted cloud water droplets, or else by random aggregation of their collisions with other ice crystals. Of the three growth processes, only aggregation changes the ice particle concentration. The algorithm is based essentially on a simplified description of the aggregation mechanism. Selected steps are as follows:

Particle size distribution expressed in "equivalent melted diameter" is assumed to be exponential, i.e.:

$$N(D) = N_0 \exp(-4D/D_m) \quad (1)$$

where D is the equivalent melted diameter of the ice particle;
N(D) is the concentration of particles per m³ and per diameter range; and
$N_0$ and $D_m$ are the two parameters that characterize distribution.

The top $h_{max}$ and the base $h_{min}$ of the layer of solid precipitation are determined;
$h_{max}$ is the maximum altitude of the measured reflectivity profile Z(h).
$h_{min}$ is either the altitude of the isotherm 0° C. if the ground-level temperature is positive, or it is ground level if the ground-level temperature is negative.

The profile of the parameter $D_m(h)$ in the range $h_{max}$ to $h_{min}$ is then determined by resolving the following differential equation, whose solution can be determined analytically:

$$\frac{\partial D_m}{\partial h} = -24 \frac{4^d k_{eff} J(b,d) a}{\Gamma(4+d)\hat{a}(\hat{a}-1)} Z D_m^{b-(\hat{a}-2)} + \frac{1}{(\hat{a}-1)Z} \frac{\partial Z}{\partial h} D_m \quad (2)$$

where:

$$J(b,d) = \int_0^\infty \exp(-4x) x^b \int_0^x [x^d - x'^d] \exp(-4x') dx' dx$$

describes the collision frequency;
Z is the radar observable to be inverted in mm⁶m⁻³;
$D_m$ is in m;
a, b, c, and d are coefficients dependent on the density law F(D) for ice particles, which law is assumed to vary at $D^{-\gamma}$ (where γ can take values in the range 0.25 to 1.1 depending on the type of particles). These coefficients are drawn from Mitchell's Theory (Journal of Atmospheric Sciences, 53, 12, 1996), the subject matter of which is incorporated by reference, for representing the following power laws:
$v_t(D) = cD^d$ (where $v_t$ is the terminal fall velocity of the particle of equivalent melted diameter D):
$A = aD^b$ (where A is the effective cross-section of the particle of equivalent melted diameter D);

With coefficients depending on frequency and as a function of (D), representing by a power law the relationship between reflectivity (measured parameter), the concentration of the particles, and their mean equivalent diameter:

$$Z = \hat{a} N_0 D_m^{\hat{d}}$$

$k_{eff}$ is the coefficient of effectiveness of the aggregation process to be adjusted (the value $k_{eff}$=0.3 seems correct immediately above the isotherm 0° C.).

The integration of (2) takes place from the top, where the boundary condition is expressed by fixing the total number of particles $n_T$ (or the number of ice-forming nuclei activated at the top of the cloud). It is possible to take $n_T(h_{max})=10^6$m⁻³, which makes it possible to express the boundary condition $D_m(h_{max})$ as:

$$D_m(h_{\max}) = \left[\frac{1 Z(h_{\max})}{4 \hat{a} n_T(h_{\max})}\right]^{\frac{1}{\hat{a}-1}} \quad (3)$$

Once the profile $D_m(h)$ from $h_{max}$ to $h_{min}$ has been determined, the profiles of the other parameters of interest are computed by the following expressions:

Profile of $N_0$:

$$N_0(h) = \frac{Z(h)}{\hat{a} D_m(h)^{\hat{a}}}$$

Profile of the total number of particles $n_T(h)$ (in m⁻³):
$n_T(h) = 0.25 N_0(h) D_m(h)$
Profile of the ice water content IWC(h) (in g/m³):

$$IWC(h) = (1.2272) 10^4 N_0(h) D_m(h)^4$$

Profile of the solid precipitation rate R(h) (mm/h equivalent melted):

$$R(h) = (1.885) 10^6 c \frac{\Gamma(4+d)}{4^{(4+d)}} N_0(h) D_m(h)^{(4+d)}$$

Vertical profile of the Doppler velocity $V_D(h)$ (in meters per second (m/s)), given by a power law dependent on density_(D):

$$V_D(h) = p D_m(h)^q$$

Figure 7:
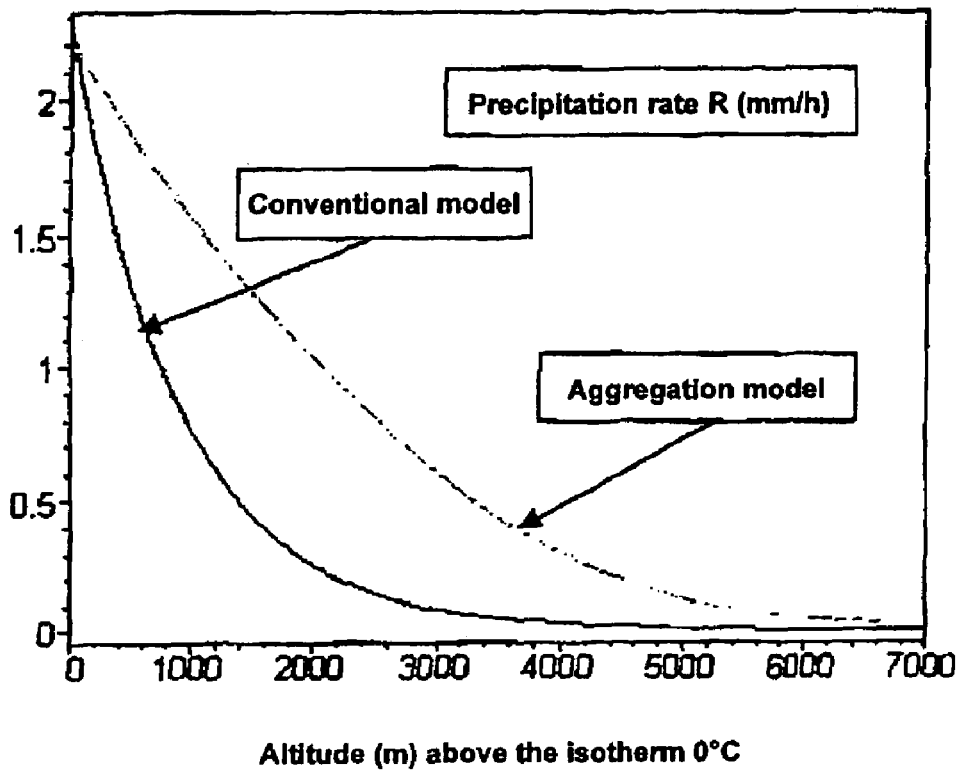
FIG. 7 is a graph of the profile of R resulting from Z being inverted by the aggregation model compared with a conventional estimator.

Because of the dependency of the coefficients relative to the density law F(D), the retrieval of the precipitation rate depends critically on the parameter γ, as shown by FIG. 7. The density law thus constitutes a key parameter.

Figure 4:
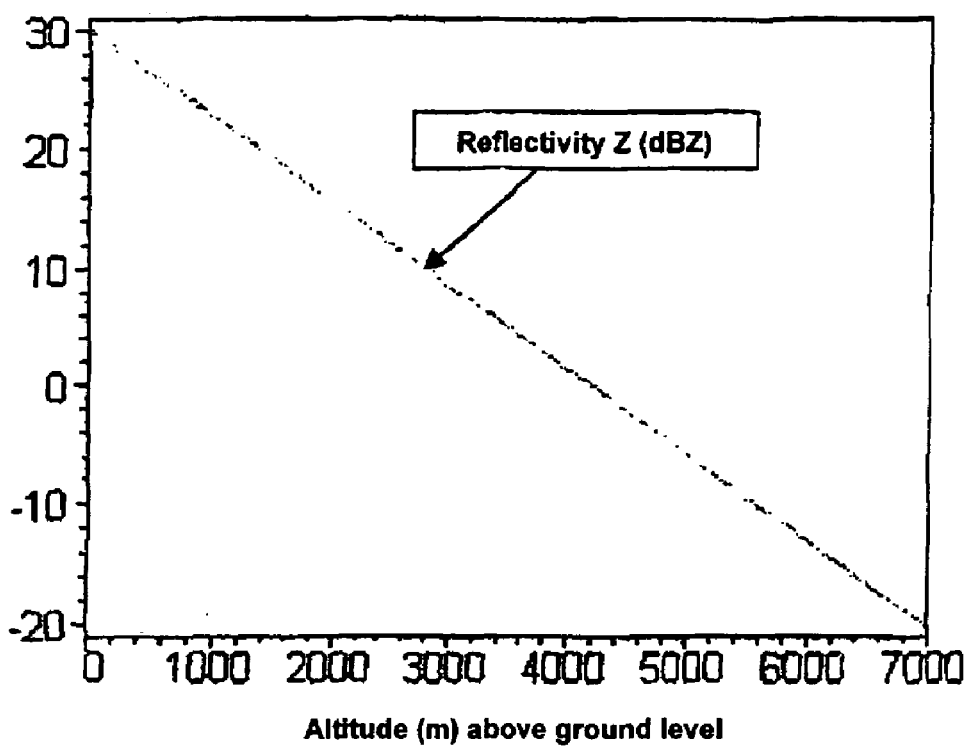
FIG. 4 is a graph of the vertical profile of Z to be inverted.
Figure 5:
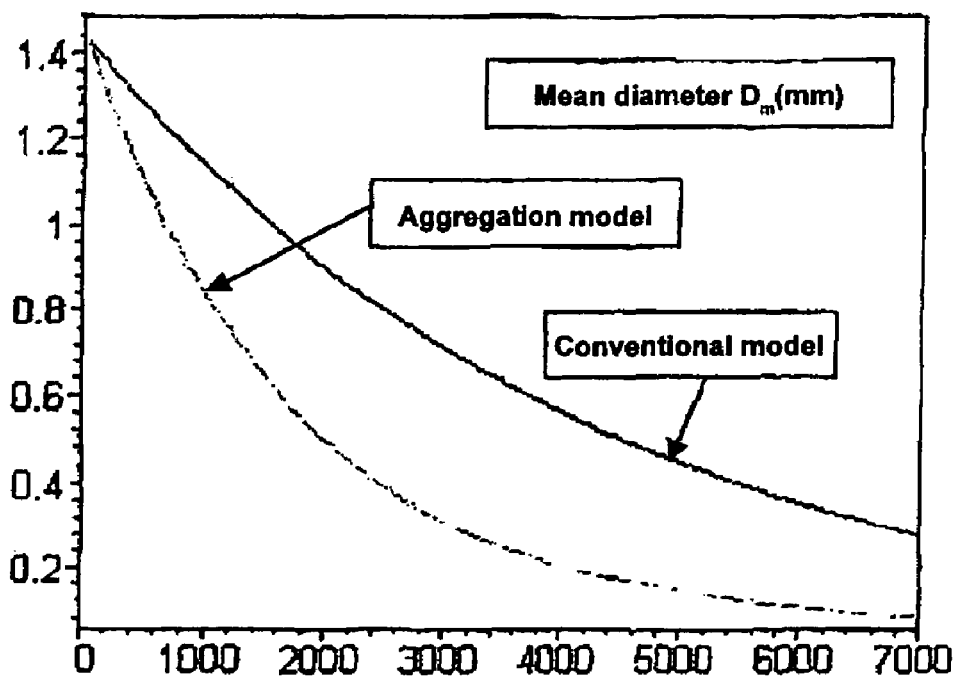
FIG. 5 is a graph of the profile of Dm resulting from Z being inverted by the aggregation model compared with the conventional estimator.

By operating in vertical firing, it is possible to measure the Doppler velocity $V_D(h)$, and compare it with $V_D(h)$ computed by the algorithm. The Doppler velocity profile is discriminating, as shown by FIG. 8. By successive adjustments, it is thus possible to determine the parameter γ of the law F(D) for which consistency between $V_D(h)$ as computed and $V_D(h)$ as measured is achieved. FIG. 4 shows an example of a profile inverted by the algorithm (in that example, the isotherm 0° C. is at ground level). FIG. 5 shows curves resulting from application of the aggregation model and a conventional model, making it possible for the profile of $D_M$ resulting from the inversion of Z by the aggregation model to be compared with the conventional estimator.

Figure 6:
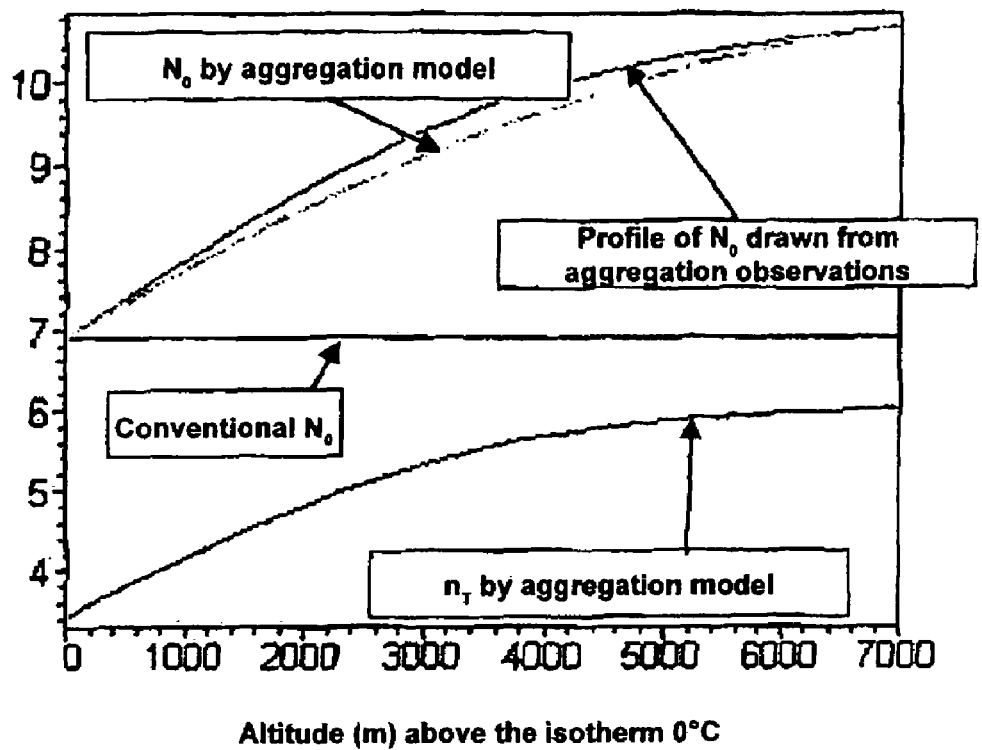
FIG. 6 is a graph of the profiles of N0 and nT resulting from the Z being inverted by the aggregation model compared with a conventional hypothesis and observations.

FIG. 6 shows curves of the profiles as a function of altitude (m) above the isotherm 0° C. It enables the profiles of $N_0$ and $n_T$ resulting from Z being inverted by the aggregation model to be compared with the conventional hypothesis and observations. FIG. 7 shows the profile of R resulting from Z being inverted by the aggregation model compared with the conventional estimator. FIG. 8 shows the sensitivity of the retrieval of the equivalent participation rate (mm/h) to the particle density law $\rho(D) \propto D^{-\gamma}$. FIG. 9 shows the sensitivity of the retrieval of the vertical Doppler velocity to the particle density law $\rho(D) \propto D^{-\gamma}$.

The invention claimed is:

1. A method of estimating precipitation characteristics comprising:
    acquiring a radar image including at least a vertical plane of a precipitation zone;
    processing via a computation unit a vertical profile of said precipitation zone to generate digital signals representative of reflectivity in vertical direction z;
    integrating via the computation unit the signals representative of reflectivity by assimilation of a reflectivity vertical profile in an aggregation model to generate a signal representative of the profile in the vertical plane of a mean particle diameter weighted by mass of each particle; and determining via the computation unit and displaying on a display device connected to the computation unit, concentration of the solid particles on the basis of signals representative of the profile in a vertical plane of a mean particle diameter weighted by mass of each particle.

2. The method according to claim 1, wherein integrating comprises determining variable Z(h) of the radar image observable in $mm^6/m^3$ as a function of altitude h on the basis of the radar image, and determining the mean diameter Dm(h) of the particles with the following equation:

$$\frac{\delta D_m}{\delta h} \equiv -0.25 k_{\mathit{eff}} a D_m^{b-5} 10^{-18} Z + \left(\frac{11 \delta Z}{6 Z \delta h}\right) D_m \quad (2)$$

where:

Z is the radar image to be inverted in $mm^6/m^{-3}$;

$D_m$ is in meters (m);

a and b are coefficients specific to aggregate particles;

$k_{\mathit{eff}}$ is the coefficient of effectiveness of aggregation to be adjusted.

3. The method according to claim 2, wherein the coefficient $k_{\mathit{eff}}$ is equal to 0.3.

4. The method according to claim 2, wherein the coefficient a is equal to 35184.

5. The method according to claim 2, wherein the coefficient b is equal to 3.16.

6. The method according to claim 1, wherein the integration constant is determined so that the value $D_m(h)$ at the top of a cloud corresponds to the predetermined value for the total number of particles at the top of the cloud.

7. The method according to claim 1, wherein the profile of the total number of particles $n_t(h)$ is determined by the following equation:

$n_T(h)=x.Z(h)/D_m(h)^6$.

8. The method according to claim 1, wherein x is equal to $25.4\ 10^{-18}$.

9. The method according to claim 1, wherein meteorological parameter $N_O(h)$ is determined by the following equation:

$N_O(h)=y.Z(h)/D_m(h)^7$.

10. The method according to claim 1, wherein y is equal to $102\ 10^{-18}$.

11. The method according to claim 1, wherein the meteorological parameter corresponding to the profile of the ice water content IWC(h)(in $g/m^3$) is determined by the following equation:

$IWC(h)=wZ(h)/D_m(h)^3$.

12. A method according to claim 11, wherein w is equal to $1.25\ 10^{-12}$.

13. A profile determined according to claim 1, wherein the meteorological parameter corresponding to a profile of solid precipitation rate R(h)(mm/h equivalent melted) is determined by the following equation:

$R(h)=r.Z(h)/D_m(h)^{2.35}$.

14. The method according to claim 1, wherein characterized in that r is equal to $4.698\ 10^{-10}$.

15. A method of estimating precipitation rate for solid precipitation comprising:

an acquisition step comprising acquiring a radar image including at least a vertical plane of a precipitation zone and processing via a computation unit a vertical profile of said precipitation zone to deliver digital signals representative of reflectivity in the vertical direction z;

an integration step comprising integrating via the computation unit signals representative of reflectivity by assimilation of the reflectivity vertical profile in an aggregation model to deliver a signal representative of the profile in the vertical plane of a mean particle diameter weighted by mass of each particle; and a determination and displaying step comprising determining via the computation unit and displaying on a display device connected to the computation unit, concentration of the solid particles on the basis of signals representative of the profile in a vertical plane of a mean particle diameter weighted by mass of each particle.

16. The method according to claim 15, wherein the integration step comprises determining variable Z(h) of the radar image observable in $mm^6/m^3$ as a function of the altitude h on the basis of the radar image, and determining the mean diameter Dm(h) of the particles with the following equation:

$$\frac{\delta D_m}{\delta h} \equiv -0.25 k_{\mathit{eff}} a D_m^{b-5} 10^{-18} Z + \left(\frac{11 \delta Z}{6 Z \delta h}\right) D_m \quad (2)$$

where:

Z is the radar image to be inverted in $mm^6/m^{-3}$;

$D_m$ is in meters (m);

a and b are coefficients specific to aggregate particles;

$k_{\mathit{eff}}$ is the coefficient of effectiveness of aggregation to be adjusted.

17. The method according to claim 15, wherein the integration constant is determined so that the value $D_m(h)$ at the top of a cloud corresponds to the predetermined value for the total number of particles at the top of the cloud.

18. The method according to claim 15, wherein the profile of the total number of particles $n_t(h)$ is determined by the following equation:

$n_T(h)=x.Z(h)/D_m(h)^6$.

19. The method according to claim 15, wherein meteorological parameter $N_O(h)$ is determined by the following equation:

$N_O(h)=y.Z(h)/D_m(h)^7$.

20. The method according to claim 15, wherein the meteorological parameter corresponding to a profile of ice water content IWC(h)(in $g/m^3$) is determined by the following equation:

$IWC(h)=wZ(h)/D_m(h)^3$.

* * * * *